United States Patent Office 2,906,095
Patented Sept. 29, 1959

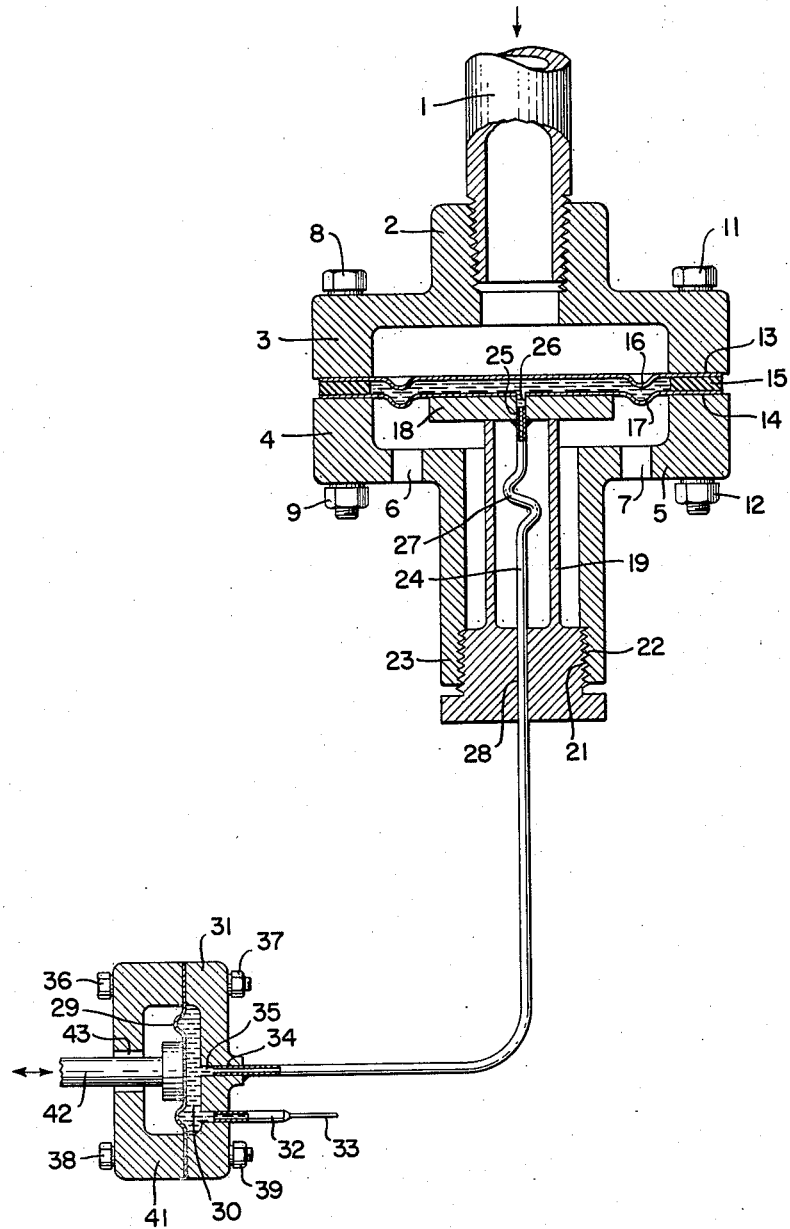

2,906,095
TRANSMITTING APPARATUS

Robert C. Whitehead, Jr., Oreland, Pa., assignor to Minneapolis-Honeywell Regulator Company, Minneapolis, Minn., a corporation of Delaware Application December 13, 1956, Serial No. 628,159

9 Claims. (Cl. 60—54.5)

The general object of the invention is to provide a novel ambient temperature compensating liquid pressure seal through which changes in the magnitude of a corrosive fluid pressure may be accurately transmitted to a pressure indicating and/or controlling instrument.

A more specific object of the present invention is to provide the aforementioned pressure seal with two members, the difference in the linear coefficient of expansion of which acts to nullify any volume change that takes place in the liquid inside such a seal when a change in ambient temperature occurs.

A still more specific object of the present invention is to provide a temperature compensating liquid seal that has a movable wall portion operably connected to an ambient temperature compensating part that is partially made of a material having a low linear coefficient of expansion and partially made of a material having a high linear coefficient of expansion which part will cause either an expansion or reduction in the internal volume of the seal to occur depending on whether the ambient temperature is rising or falling.

A better understanding of the present invention may be had from the following detailed description which reads in connection with the accompanying drawing in which:

The drawing discloses a cross-sectional view taken through the novel ambient temperature compensating seal disclosed in this application.

The drawing shows a typical ambient temperature compensating seal that is used to transmit changes in the magnitude of a corrosive fluid to a force-actuated member which member in turn can be used to actuate a pressure indicating and/or controlling instrument not shown.

The drawing illustrates an inlet tube 1 through which the pressure of a corrosive fluid acting in the direction of the arrow is transmitted into a larger tubular element 2. The latter terminates in an annular rim 3 which is in end-to-end relation with the annular element portion 4 of a tubular member 5. As shown, the member 5 is in open communication with the surrounding atmosphere through ports 6 and 7.

Suitable connecting means such as the pair of bolt and nut connections 8, 9, and 11 and 12 are used to clamp the adjacent annular edges 3 and 4 of the members 2 and 5 rigidly against the peripheral portions of the metal diaphragms 13 and 14 that are separated by an annular rim element 15. The rim element 15 in turn may be bonded or welded at its upper and lower surfaces to the diaphragms 13 and 14. The diaphragms 13 and 14 are made from a slightly flexible metal such as stainless steel and the disc 15 between same is made of a similar metal. Any other slightly flexible material that is impervious to a corrosive fluid acting thereon may be suitable for this purpose. As shown, the diaphragm 13 is formed with the circular groove 16 coaxial with the tube 1 and extending downward away from the center of the tube 1. The lower diaphragm 14 includes a depending annular groove 17 directly beneath the groove 16. The central portion of the diaphragm 14 rests on and is directly fixedly supported by a disc 18. The upper surface of this disc 18 is fixedly connected by a suitable bonding or welding material to the lower surface of the diaphragm 14 and the lower surface of the disc is as shown supported by a tubular member 19. This tubular member 19 is made of an alloy such as Invar that possesses a low coefficient of expansion characteristic. The lower end of the member 19 is shown having an external screw threaded portion 21 that is in threaded engagement with internal screw threads 22 on the inner surface of the tubular portion 23. The latter is a depending tubular section beneath the member 5 and is made of a material such as stainless steel that possesses a high coefficient of expansion.

Liquid under pressure is transmitted away from the space between the diaphragms 13 and 14 by way of the capillary tube 24. One of the end portions of the tube 24 is attached at 25 to the bored out wall portion 26 in disc 18. This tube contains a bent extensible portion 27 adjacent its upper end and is shown extending downward through the tube 19 and its externally threaded portion 21. A portion of the capillary tube 24 extends through and is fixedly connected at 28 to the portion 21 and thence opens into a hollow chamber formed by the flexible diaphragm 29 and the container element 31. To fill this chamber and the capillary system noted supra the system is evacuated and a liquid such as a silicon oil 30 is transmitted in a conventional manner under pressure into the chamber 29, 31 through a conduit 32. After the system has been filled the end of the conduit 32 is then sealed at 33 in a conventional manner.

The outer surface 34 of the lower end of the capillary tube 24 is fixedly connected to the outer wall surface 35 that forms an aperture in the container element 31. Suitable connecting means such as a pair of bolt and nut connections 36—39 are used to clamp the container element 31 to the stationary casing element 41.

An output force transmitting member 42 engages the outer wall of the diaphragm 29 and is adapted for use in transmitting a force through the aperture 43 in the element 41 to a corrosive fluid pressure measuring and/or controlling instrument that is connected to the left end of the force transmitting member 42. With this arrangement the force transmitted to such an instrument will be directly proportional to the pressure that the fluid in the inlet tube 1 is applying to the upper surface of the diaphragm 13.

From the aforementioned description of the elements it can thus be seen that the present invention makes use of the difference between the linear coefficient of expansion of the Invar tube 19 that has a low coefficient of expansion and the tubular portion 23 that has a high coefficient of expansion to cause the separation of the lower diaphragm 14 away from or toward the diaphragm 13 in order to nullify the volume change effect that occurs in the hydraulic fill due to a change in temperature acting on such a fill.

In the operation of the apparatus described above and during a condition in which the ambient temperature remains at a fixed level the volume of the hydraulic fill between diaphragm 13 and diaphragm 29 will remain constant and in no way cause the space between the diaphragms 13 and 14 to be changed. Under this fixed ambient temperature condition an increase in the corrosive fluid pressure in conduit 1 acting on the diaphragm 13 will cause the hydraulic fill to transmit a force through the capillary 24 to the right side of the diaphragm 29 which force will be proportional to the pressure of the fluid acting on the top of the diaphragm 13. It can thus be seen that under these conditions no inaccuracies due to the fill will be introduced into such a pressure to force transforming apparatus.

In the operation of the aforementioned apparatus wherein an increase in ambient temperature is occurring and the pressure of the corrosive fluid acting on the upper surface of the diaphragm 13 remains constant such a change in temperature will act in such a fashion as to move the disc 18 in a downward direction due to the difference in linear expansion of the stainless steel tube 23 and the Invar tube 19. As this disc 18 is moved in a downward direction due to the increase in ambient temperature the lower diaphragm 14 attached thereto will likewise be moved in this same direction and thus create a void between the lower diaphragm 14 and the upper diaphragm 13. As the ambient temperature continues to increase this void will likewise be caused to increase at the same rate at which the volume of the hydraulic fill between the diaphragm 13 and the diaphragm 29 is increasing. This change in internal space of the seal may be accomplished by properly selecting materials for the parts 19 and 23 which have a difference of linear coefficient of expansion that will effect such a change by its action on the diaphragm 14.

Under a condition in which the corrosive fluid pressure in the aforementioned pressure to force transforming apparatus acting on the top of diaphragm 13 remains constant and a decrease in ambient temperature occurs a difference in shrinkage that will then occur between the stainless steel tube 23 and the Invar tube 19 will cause the disc 18 and its associated diaphragm 14 attached thereto to move in an upward direction toward the diaphragm 13 thus tending to remove the void that existed between the diaphragms when the ambient temperature had been previously increased.

From the above operation of the pressure to force transforming apparatus it can be seen that the lower diaphragm 14 forms an adjustable cavity wall into which the expanding fill can go when the ambient temperature increases the volume of the hydraulic fill. In this way any adverse pressure build-up in the hydraulic fill due to such an ambient temperature rise is prevented from changing the magnitude of the corrosive fluid pressure that is being transmitted in the form of a liquid force through the hydraulic fill to the input force transmitting member 42.

The present invention has thus provided a fluid-filled compensated pressure seal and fluid-filled pressure transmitting apparatus that will prevent volume changes due to changes in temperature of the atmosphere that surrounds such an apparatus from affecting the magnitude of the pressure that is being transmitted to a force receiving means.

What is claimed is:

1. A fluid filled pressure to force transforming apparatus comprising, a substantially stationary first diaphragm, a second diaphragm, said diaphragms being operably connected to form a first capsule, a second capsule, a capillary tube operably connected to transmit changes occurring in the pressure of a hydraulic transmitting fluid in said first capsule to said second capsule, an ambient temperature compensating means having two portions that have opposing coefficients of expansion external to said second diaphragm and which are respectively in surface to surface contact with the peripheral and a central surface portion of said second diaphragm, said central surface portion being operably associated with said second diaphragm to move said second diaphragm away from said first diaphragm and to automatically increase the volume of said first capsule when said volume of said transmitting fluid is expanded by an increase in ambient temperature and to move said second diaphragm toward said first diaphragm to decrease the volume of said first capsule when said transmitting fluid is decreased by a decrease in said ambient temperature.

2. The transforming apparatus specified in claim 1 wherein said compensating means is further comprised of a first tubular member having one linear coefficient of expansion that is integral with one of said portions and extends away from said second diaphragm, a second tubular member having another linear coefficient expansion, said second member being concentric with said first member and integral with the other of said portions and positioned to extend away from said second diaphragm and thread connecting means between said first and second members to adjust said position of said first member with respect to said second member.

3. The transforming apparatus of claim 1 wherein said compensating means further comprises two concentric tubular parts having different linear coefficients of expansion and wherein said difference in said expansion of said parts are used to move the said portion that is in contact with said central portion of said second diaphragm toward an expanded position upon the occurrence of said increase in ambient temperature and to move said second diaphragm toward a collapsed position on the occurrence of said decrease in ambient temperature.

4. A pressure to force transmitting system comprising a pair of diaphragms connected at their peripheral portions to form a first capsule, a capillary connecting the space between said diaphragms with a pressure to force transforming second capsule, a hydraulic fluid completely filling said capillary and said capsules and a temperature compensating means having two concentric tubes of different coefficients of expansion operably connected to one of the diaphragms of said first capsule to change the internal volume of said first capsule to accommodate the expansion and contraction of said fluid which accompanies a change in its ambient temperature.

5. A pressure to force transmitting system comprising, a liquid filled pressure seal through which the magnitude of a fluid pressure is transmitted to a force actuated receiving instrument and an ambient temperature compensating member in the form of tubes having opposing coefficients of expansion operably connected to a portion of said seal to change the internal volume of said seal at a rate that is equal to the same rate at which an ambient temperature change will cause the volume of the liquid fill in said seal to be increased or decreased.

6. A pressure to force transmitting system comprising a liquid filled pressure seal through which the magnitude of a fluid pressure is transmitted to a force actuated receiving instrument, an ambient temperature compensating member in the form of two concentric tubes wherein one of said tubes has a high coefficient of expansion and the other a low linear coefficient of expansion and means operably connecting an end of said tube having said low coefficient of expansion to a movable part of said seal to enable the area formed by an interior wall portion of said seal to be altered in accordance with changes in ambient temperature.

7. A pressure to force transmitting system comprising, a liquid filled pressure seal through which the magnitude of a fluid pressure is transmitted to a force actuated receiving instrument, an ambient temperature compensating member in the form of two concentric tubes wherein one of said tubes has a high coefficient of expansion and the other a low linear coefficient of expansion and means operably connecting an end of said tube having said low coefficient of expansion to a movable wall portion of said seal to either expand or reduce the internal volume of the seal depending on whether the ambient temperature is rising or falling.

8. A pressure to force transmitting system comprising a pair of diaphragms connected at their peripheral portions to form a first capsule, a capillary connecting the space between said diaphragms with a pressure to force transforming second capsule, a hydraulic fluid completely filling said capillary and said capsules and a temperature compensating means in the form of two concentric tubes having different coefficients of expansion whereby one of said tubes is operably connected by means of a disc to a portion of one of said diaphragms of said first capsule to change the internal volume of said first capsule at a rate that is equal to the same rate at which an ambient temperature change will cause the volume of the said hydraulic fluid to be increased or decreased.

9. A pressure to force transmitting system comprising two flexible wall portions forming a liquid filled seal through which a pressure of varying magnitude is transmitted to a force receiving means and an ambient temperature compensating means operably connected externally to one of said wall portions of said seal to alter the internal volume of said seal to thus prevent changes in volume of the liquid fill that occur within the interior of said seal from effecting the magnitude of said pressure being transmitted to said receiving means.

References Cited in the file of this patent

UNITED STATES PATENTS

| | | |
|---|---|---|
| 1,898,848 | O'Brien | Feb. 21, 1933 |
| 2,054,579 | Affleck | Sept. 15, 1936 |
| 2,087,494 | Annin | July 20, 1937 |
| 2,324,217 | Knauth | July 13, 1943 |
| 2,397,876 | Martin et al. | Apr. 2, 1946 |